United States Patent [19]

Gooden

[11] Patent Number: 4,566,530

[45] Date of Patent: Jan. 28, 1986

[54] PRESSURE OPERATED SHUTTLE VALVE

[75] Inventor: Richmond A. Gooden, Kettering, Ohio

[73] Assignee: United Aircraft Products, Inc., Dayton, Ohio

[21] Appl. No.: 493,568

[22] Filed: May 11, 1983

[51] Int. Cl.⁴ ............................................. F28F 27/02
[52] U.S. Cl. .................. 165/36; 137/625.64; 165/40; 165/103; 236/12.21
[58] Field of Search ........................ 165/35, 36, 37, 38, 165/40, 103, 32; 137/625.4, 625.64; 91/419, 459; 236/12.21, 12.2

[56] References Cited

U.S. PATENT DOCUMENTS

| | | | |
|---|---|---|---|
| 2,449,766 | 9/1948 | Brown | 236/12.21 X |
| 2,808,210 | 10/1957 | Frey | 236/12.21 |
| 2,975,308 | 3/1961 | Kilbourne et al. | 165/37 X |
| 3,036,777 | 5/1962 | Budde | 236/12.2 |
| 3,087,675 | 4/1963 | Honegger | 236/12.21 |
| 3,556,154 | 1/1971 | Kramer | 137/625.64 |
| 3,561,483 | 2/1971 | Taplin | 236/12.21 X |
| 3,964,518 | 6/1976 | Hesse et al. | 137/625.64 |
| 4,066,102 | 1/1978 | Tandrup | 137/625.64 |
| 4,291,750 | 9/1981 | Clyne et al. | 165/35 X |
| 4,342,334 | 8/1982 | Stangroom | 137/625.24 X |

Primary Examiner—Sheldon J. Richter
Assistant Examiner—Randolph A. Smith
Attorney, Agent, or Firm—J. E. Beringer

[57] ABSTRACT

A valve assembly in which a longitudinally shiftable shuttle or spool valve is positioned by varying the fluid pressure in a pressure chamber at one end thereof. Solenoid valves open and close in a pulsed response to a changing fluid condition, the flow of which fluid is regulated by the spool valve. The solenoid valves control the admission of a pressure fluid to the pressure chamber and its exhaust therefrom.

5 Claims, 3 Drawing Figures

PRESSURE OPERATED SHUTTLE VALVE

BACKGROUND OF THE INVENTION

1. Field of the Invention

This invention relates to fluid flow control systems, particularly as they include a mixing valve settable to regulate flow in a valve housing from a pair of inlets to a common outlet.

2. Description of the Prior Art

Mixing valves are known in the prior art which operate in response to a changing condition of a controlled fluid, as for example in response to temperature change. Operation of the valve has, however, been by direct acting thermostat or the like, or, relatively remotely, by a motor and connected linkage. In both instances there is a limited preciseness of control, and, at least in the case of the motor and linkage form, there are weight and bulk which in some installations may be unacceptable. Moreover, power acting thermostats and motor-linkage assemblies are relatively high in cost and may have reliability problems.

SUMMARY OF THE INVENTION

A valve assembly according to the present invention comprises a longitudinally shiftable spool valve controlling fluid flow from a pair of fluid inlets to a common fluid outlet. A spring at one end of the valve urges it to endwise motion in one sense. A fluid pressure chamber receives an opposite end of the valve and pressure therein applied in opposition to the spring is used variably to position the valve to admit fluid flow at a first inlet while blocking it at a second inlet; to admit fluid flow at the second inlet while blocking it at the first; and to admit mixed flows at both inlets simultaneously. A solenoid valve controls admission of a pressure fluid to the pressure chamber. Another solenoid valve controls the escape of pressure fluid from the pressure chamber. A sensor responding to a changing condition of fluid exiting the common outlet initiates the sending of energizing signals to the solenoid valves as a result of which the magnitude of the fluid pressure in the pressure chamber becomes a measure of the sensed fluid condition and rises and falls in accordance with directional changes in such condition from a selected reference value. A fluid flow in which the changing fluid condition at the common fluid outlet is held within a relatively narrow range is thereby insured. Fluid pressure operated control of the movements of the spool valve, and solenoid valve maintenance of a control pressure, provide for a close regulation of the outlet fluid condition. Apparatus included is simple, unlikely to get out of repair, relatively light in weight and easily assembled. It is readily embodied in and functions advantageously in fluid flow systems, for example in a system recirculating a liquid coolant through a heat producing means, in which system it is desired to deliver the liquid coolant to the heat producing means at or about a predetermined value.

An object of the invention is to provide a valve assembly substantially as set forth.

Other objects and structural details of the invention will more clearly appear from the following description when read in connection with the accompanying drawings, wherein.

Figure 1:
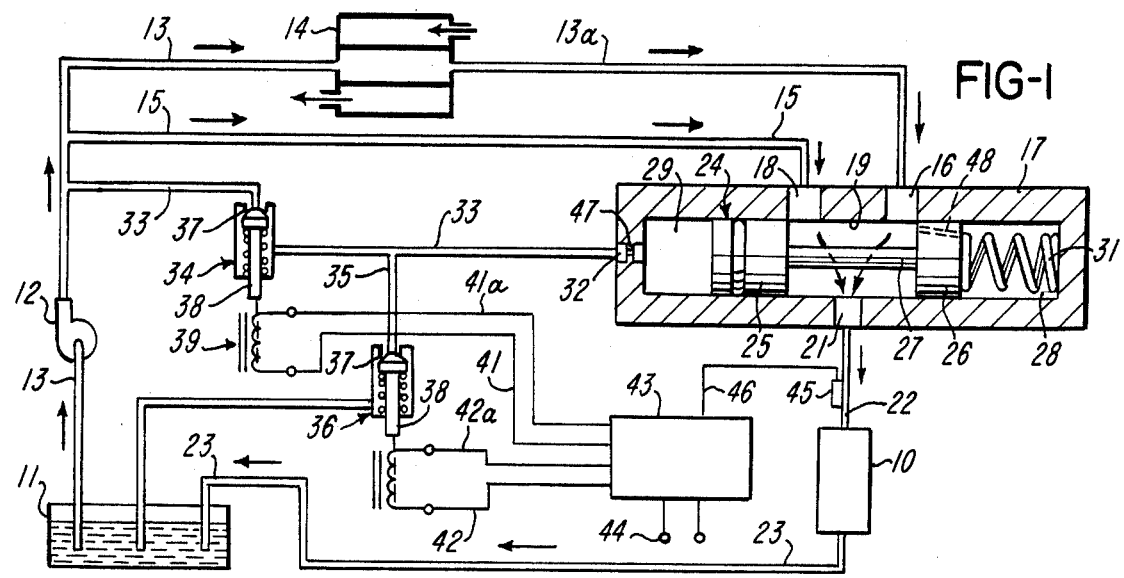
FIG. 1 is a view of a valve assembly in accordance with an illustrated embodiment of the invention, showing both the inlet and outlet solenoid valves closed and the spool valve balanced in an intermediate position in which both fluid inlets are open.

Referring to the drawings, a valve assembly in accordance with the invention may be embodied, as shown, in a system circulating a liquid coolant to absorb and dissipate heat generated in a heat producing means such as an electronics component 10. The liquid coolant may be regarded as having a source in a reservoir 11. Under the urging of a pump 12, coolant is withdrawn from the reservoir 11 by way of a line 13 and directed thereby alternatively through a heat exchanger 14 or heat exchanger by-pass passage 15, or both. In the heat exchanger, coolant heated by reason of having absorbed heat at source 10 and by reason of pump operation, is in a heat transfer relation to another and relatively cooler flowing fluid, and, in accordance with conventional practice, is cooled thereby.

Beyond heat exchanger 14, the line 13 projects as an extension 13a to inlet opening 16 of a valve body 17. By-pass passage 15 leads directly to another body inlet opening 18 which is in an adjacent, parallel relation to inlet opening 16. The body 17 has an interior bore 19 through which coolant admitted by way of inlet opening 16 or inlet opening 18, or both, has access to a common outlet opening 21. Inlet openings 16 and 18 locate generally centrally of the length of bore 19. Outlet opening 21 locates generally opposite and centrally of inlet openings 16 and 18.

Coolant exiting outlet opening 21 is directed by a line 22 to the heat producing component 10. In flowing through an operating component 10, the coolant absorbs excess thermal energy, and, at a relatively elevated temperature level, is returned by a line 23 to reservoir 11. In circulating and recirculating through the system, a heated coolant has its temperature lowered in heat exchanger 14, or, if not in need of cooling, flows in bypassing relation to the heat exchanger by way of passage 15. The intent and effect, as will hereinafter more clearly appear, is continuously to supply to the heat producing component 10 a coolant of a heat absorbing capacity to limit heat rise within the component to a predetermined high temperature value or to a narrow range of temperature values.

This temperature control is obtained by flow control according to which the pumped coolant passes through the heat exchanger or in by-passing relation to it or as a mixed flow partly through the heat exchanger and partly through the by-pass. Effecting such flow control is a spool type valve element 24 slidable in bore 19 of valve body 17. Longitudinally spaced apart spool portions 25 and 26 of the valve element are slidably received in bore 19 and are connected by a reduced diameter portion 27. As will be understood, spool portions 25 and 26 operate selectively to open and to close respective fluid inlets 18 and 16 in response to a longitudinal shifting motion of the valve element. Different exemplary positions of the valve element are shown in the several drawings.

The spool valve element 24 defines with opposite ends of the bore 19 what may be termed a spring chamber 28 and a pressure chamber 29. A coil spring 31 is based on an end wall of the bore, in chamber 28, and acts on the adjacent end of element 24 to urge it leftward or in the direction of the opposite bore end wall. In such opposite end wall is an opening 32 by which pressure may be admitted to chamber 29 and exhausted therefrom. Fluid pressure in chamber 29 is applied in opposition to spring 31, and the valve element 24 tends to assume a longitudinal position of adjustment in which the opposing pressures are balanced.

Fluid under pressure reaches chamber 29 by way of a flow line 33 extending to opening 32 from flow line 13 at a location beyond or on the pressure side of pump 12. A pressure fluid inlet control valve 34 is in the flow line 33. Fluid is exhausted from chamber 29 by way of a flow line 35 leading back to reservoir 11 from a location in flow line 33 between valve 34 and opening 32. A pressure fluid outlet control valve 36 is in flow line 35. Valves 34 and 36 are generally conventional solenoid operated valves assuming normally a closed position and opening in response to the energizing of an integrally associated electromagnetic device. As here diagrammatically illustrated, each valve 34 and 36 includes a valve seat 37 incorporated in a respective line 33 or 35, and a valve element plunger 38 spring urged to a respective valve seat. The valve is thus normally closed. Each valve further includes an electrical coil 39 which when energized lifts the valve plunger from its valve seat and opens flow through the respective controlled flow line. The opening and closing of valves 34 and 36 regulates the level of the fluid pressure in chamber 29 and thereby controls the longitudinal positioning and repositioning of the spool valve 24.

The solenoid coils of the respective valves 34 and 36 are in related individual energizing circuits and 42–42a. These emanate from an electronic controller 43 activated through power cord means 44. A temperature sensor 45 is in flow line 22, in advance of the heat producer 10, and sends electrical signals to controller 43 through a conductor 46 as changes in fluid temperature are sensed. Thus, assuming a desired input fluid temperature, at the entrance to heat producer 10, to have been established, any departure from that temperature value causes an electrical signal to be sent from sensor 45 to controller 43. At the controller 43, the direction and extent of temperature change are analyzed and appropriate electrical pulses are sent to the electromagnetic coils 39 of the valves 34 and 36. The sensor 45 and controller 43 are technologically known devices which for convenience of disclosure are here illustrated only in diagrammatic form. The controller 43 is one of a kind functioning by producing short length relatively frequent pulses whereby a valve 34 or 36 is opened and closed in brief successive cycles. Sensor 45 is responsive to temperature change in the fluid flowing to heat producer 10 and delivers appropriate signals to be analyzed at controller 43.

Figure 2:
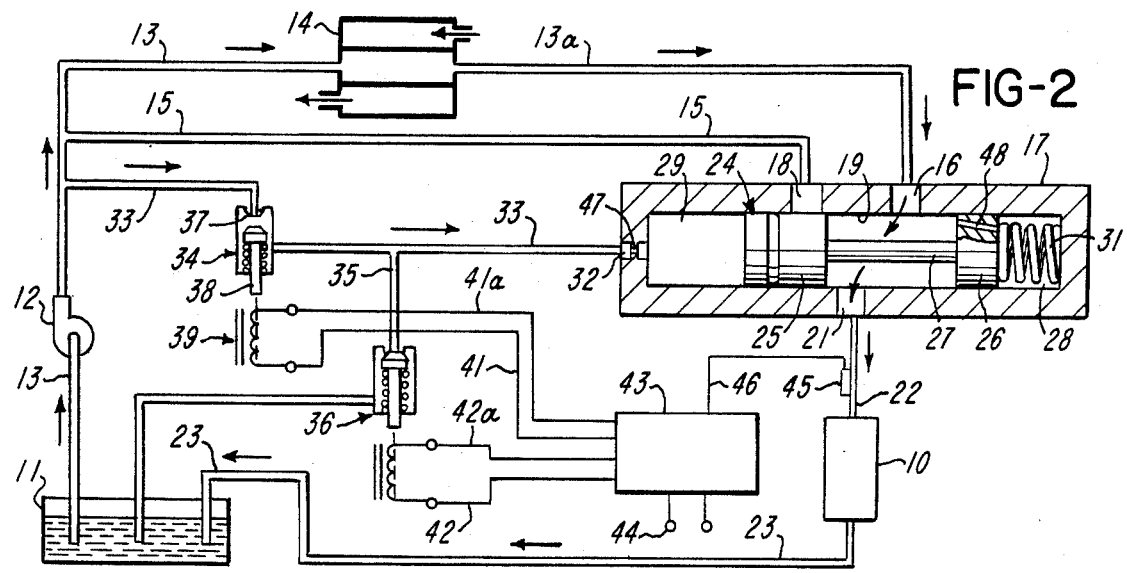
FIG. 2 is a view like FIG. 1, showing the inlet solenoid valve open and the spool valve set to close one only of the fluid inlets.
Figure 3:
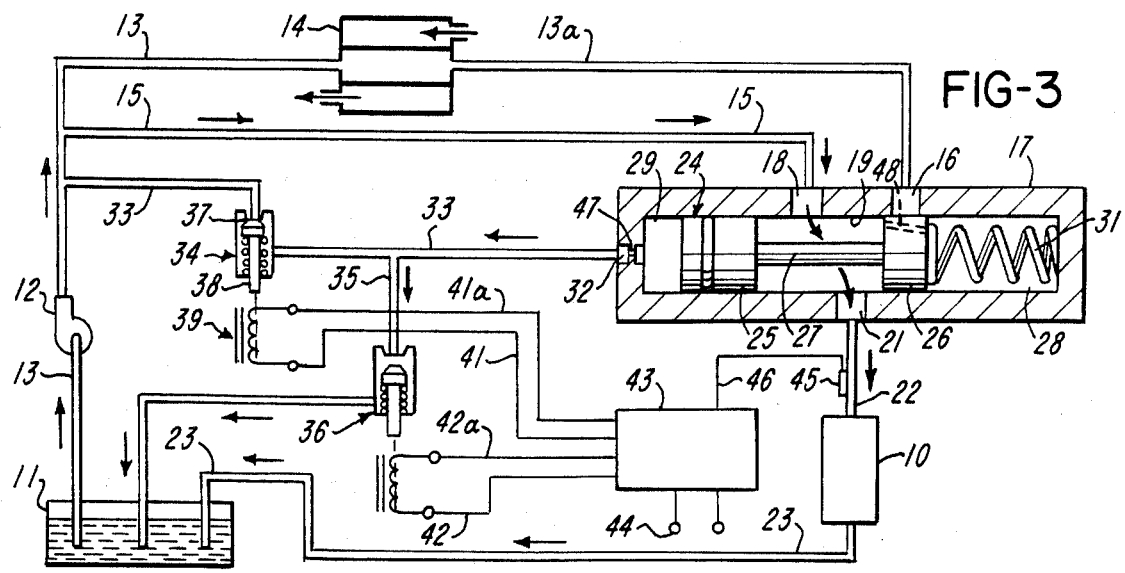
FIG. 3 is a view like FIGS. 1 and 2, showing the inlet solenoid valve closed and the outlet solenoid valve open, with the spool valve assuming a position to close the other one only of the fluid inlets.

In the operation of the valve assembly, what may be regarded as a start-up condition is illustrated in FIG. 3. As there indicated, sensor 45 has found initially flowing fluid to be cold or below the temperature at which fluid entering heat producer 10 is required to be regulated. As controlled by controller 43, therefore, inlet control valve 34 is closed and outlet control valve 36 is open. There is a consequent absence of pressure in chamber 29, and spool valve 24 assumes under the urging of spring 31 a position closing inlet opening 16 and opening inlet opening 18. Flow through heat exchanger 14 is blocked and all the output of pump 12 is directed through by-pass passage 15 to and through inlet opening 18. As heat producer 10 begins to reject heat to the circulating fluid, a rising fluid temperature is effective through sensor 45 and controller 43 to close valve 36 and open valve 34. Chamber 29, being thereby no longer vented and being open to a flow of pressure fluid thereto, becomes pressurized, with contained pressure being applied to the adjacent end of spool valve 24 in opposition to spring 31. As chamber pressure rises, spring 31 yields and valve 24 moves rightward to assume a position in which opposing spring and fluid pressures are balanced, as for example a position as shown in FIG. 1 or a position as shown in FIG. 2. A former position, as shown, finds both inlets 16 and 18 open so that a mixture of cooled and uncooled liquid coolant from pump 12 reaches common outlet 21. A latter position, as shown, finds spool portion 25 closing inlet 18 while inlet 16 is fully open. At this time, therefore, flow through by-pass 15 is blocked, all flow to common outlet 21 being by way of heat exchanger 14. The spool valve, it will be understood, may assume an infinite number of positions between what may be regarded as the extremes of FIGS. 1 and 3, varying the proportions of flow admitted at inlets 16 and 18.

In a position of adjustment of the spool valve admitting coolant to the heat producer 10 at a temperature correct to achieve a desired temperature or narrow band of temperatures within device 10, both valves 34 and 36 will be closed (FIG. 1), trapping fluid in chamber 29 and maintaining the valve position. As the heat producer temperature rises or falls from its desired level, note is taken of the temperature change by sensor 45 which sends an appropriate signal to controller 43. There the direction and extent of temperature change are analyzed and electrical pulses sent to the valve 34 or valve 36, opening the former while maintaining the latter closed, or vice versa. The pressure in chamber 29 is in this manner changed, with consequent readjustment in the position of the spool valve and resultant correction in the proportions of cooled and uncooled fluids reaching the heat producer. Advantageously, the controller 43 is structured to energize the solenoid coils of valves 34 and 36 in short pulses giving the system time to recognize and respond to changes in sensed fluid temperature, and avoiding overregulation. As sensed temperature returns to that considered normal, pulsing to the solenoid valves is discontinued and the system stablizes with both valves 34 and 36 closed. The controller further will function to open and close both valves 34 and 36 substantially simultaneously to open one valve while closing the other, and to close both valves at the same time. It is structured, however, not to open either valve while the other is held open.

The sensitivity of response of spool valve 24 is affected by a plate type orifice or restriction 47 in body opening 32. Orifice 47 restricts the rate of flow to and from chamber 29, damping movements of the spool valve.

Head 26 of the spool valve has a through aperture 48, the presence of which obviates fluid entrapment in spring chamber 28.

It will be evident that components 43 and 45 hereof are of interest herein as elements of a system supporting the valve assembly. Details of their construction and mode of operation are not included, as they are drawn from and based in existing technology. Similarly, the valve assembly is shown in diagrammatic form as it is evident that valves and related parts may assume a variety of structural forms.

What is claimed is:

1. In a fluid circulating system including fluid conducting lines a pump, a reservoir, a heat producing component, a heat exchanger and a valve body, said pump circulating fluid through said fluid conducting lines from the reservoir through the heat exchanger and the valve body and the heat producing component and back to the reservoir respectively and the system providing another parallel fluid conducting line leading in by-passing relation to said heat exchanger, said valve body having a plurality of fluid inlets receiving fluid respectively from said fluid conducting lines and said another parallel line and a common fluid outlet, a spool type valve slidable longitudinally in said body and variably positionable therein to control the flow of fluid from said inlets to said outlet, said valve at its one end defining with an end of said body an interior pressure chamber, the pressure in which is applied in a direction to urge said spool valve in one direction, means for diverting a portion of the circulated fluid to said pressure chamber, resilient means urging said spool valve in the opposite direction, and means responding to a changing temperature of the fluid exiting said outlet to admit the said directed portion of circulated fluid to said pressure chamber and separately and non-simultaneously to connect said pressure chamber to said reservoir.

2. A system according to claim 1, said means for directing a fluid portion including a further fluid conducting line by which a portion of the pumped fluid is returned directly to the reservoir in bypassing relation to said valve body, said pressure chamber being in communication with said further fluid conducting line, and said temperature responding means including an inlet valve controlling fluid admission to said pressure chamber and an outlet valve controlling exhaust of fluid from said pressure chamber to said reservoir.

3. A system according to claim 2, said further fluid conducting line receving pumped fluid in advance of its having access to said fluid conducting lines and said another parallel fluid conducting line.

4. A valve assembly according to claim 2, wherein a temperature sensor exposed to fluid flow returning to said reservoir controls the opening and closing of said inlet and outlet valves.

5. A valve assembly according to claim 4, wherein the opening and closing of said inlet and outlet valves is controlled in such timed relation that one or both of said inlet and outlet valves are always closed, obviating free by-passing flow of the directed fluid flow portion.

* * * * *